United States Patent [19]

Konishi

[11] 4,415,934

[45] Nov. 15, 1983

[54] IMAGE READING APPARATUS

[75] Inventor: Motofumi Konishi, Yokohama, Japan

[73] Assignee: Canon Kabushiki Kaisha, Tokyo, Japan

[21] Appl. No.: 319,880

[22] Filed: Nov. 10, 1981

[30] Foreign Application Priority Data

Nov. 19, 1980 [JP] Japan .............................. 55-162980
Feb. 16, 1981 [JP] Japan ................................ 56-21132
Feb. 16, 1981 [JP] Japan ................................ 56-21133

[51] Int. Cl.³ .......................... H04N 1/04; H04N 1/18
[52] U.S. Cl. .................................... 358/294; 358/293; 358/102
[58] Field of Search ................. 358/293, 294, 75, 285, 358/102

[56] References Cited

U.S. PATENT DOCUMENTS 4,318,135 3/1982 Allis ..................................... 358/293
4,323,919 4/1982 Fujii ..................................... 358/75

Primary Examiner—Howard Britton
Attorney, Agent, or Firm—Fitzpatrick, Cella, Harper & Scinto

[57] ABSTRACT

An apparatus for reading the image of an original by focusing said image through a lens onto photosensor, in which an optical path divider is provided between the lens and the image plane for dividing the path for a light beam of a scan line, whereby the light beam passing through a divided light path is detected by first photodetector while the light beam passing through another divided light path is detected by second photodetector so that the image is divided into plural areas in which the image is converted into electrical signals by means of independent first and second photodetectors.

14 Claims, 10 Drawing Figures

IMAGE READING APPARATUS

BACKGROUND OF THE INVENTION

1. Field of the Invention

The present invention relates to an image reading apparatus for providing electric signals corresponding to the image on an original by optical scanning thereon.

2. Description of the Prior Art

In an image reading apparatus employed, for example, in a facsimile apparatus of the like, an original moving in a determined direction is illuminated with light, and the reflected or transmitted light is focused through a lens onto a photoelectric converter, such as a photosensor array, to provide time-sequential electric image signals corresponding to a scanning line. Said photosensor array is usually composed of a charge-coupled device array or a photodiode array on which the image of a scanning line is focused by said lens. In the facsimile apparatus, the electric image signals are converted into suitable codes and transmitted to a distant place for example through a telephone line. Upon completion of reading of a scanning line, an original feed mechanism is activated to advance the original by a scanning pitch, and to conduct the reading of the next scanning line. The transmission of the original image is achieved by repeating the above-mentioned procedure.

In this case the resolving power of the image is determined by that of the photosensor array, which is equal to the number photoelectric converting elements in said photosensor array. Usually the number of said elements in a photosensor array is limited to 1500–2000. It is necessry to increase the number of said elements for example when the original is a microfilm, but a photosensor array including 3000–4000 elements is expensive. It may also be possible to project an enlarged image onto plural photosensor arrays arranged linearly, but the signals are inevitably lost between the neighboring photosensor arrays where the photosensitive elements are not present. For this reason there have been employed plural sets of an imaging lens and a photosensor array, but such a solution is defective in requiring plural units of expensive lenses.

SUMMARY OF THE INVENTION

The object of the present invention is to provide an image reading apparatus capable of reading an image with a high resolving power.

Another object of the present invention is to provide an image reading apparatus capable of easily reading a small image such as on a microfilm.

Still another object of the present invention is to provide an image reading apparatus capable of reading an image with a high resolving power and with a high precision through a single lens.

Still another object of the present invention is to provide an image reading apparatus of a simple structure with a reduced cost.

Still another object of the present invention is to provide an image reading apparatus capable of providing image signals not associated with the effect of unevenness in the illumination of the image.

The foregoing objects are achieved according to the present invention by an image reading apparatus comprising optical path dividing means for dividing the path for the light beam of a scanning line projected by a lens into at least two optical paths, first photodetector means for receiving the light beam passing through one of said divided optical paths to provide electric signals corresponding to the image, and second photodetector means for receiving the light beam passing through the other of said divided optical paths to provide electric signals corresponding to the image.

The present invention will be further clarified by the following description of the preferred embodiment to be taken in conjunction with the attached drawings.

DETAILED DESCRIPTION OF THE PREFERRED EMBODIMENTS

Figure 1:
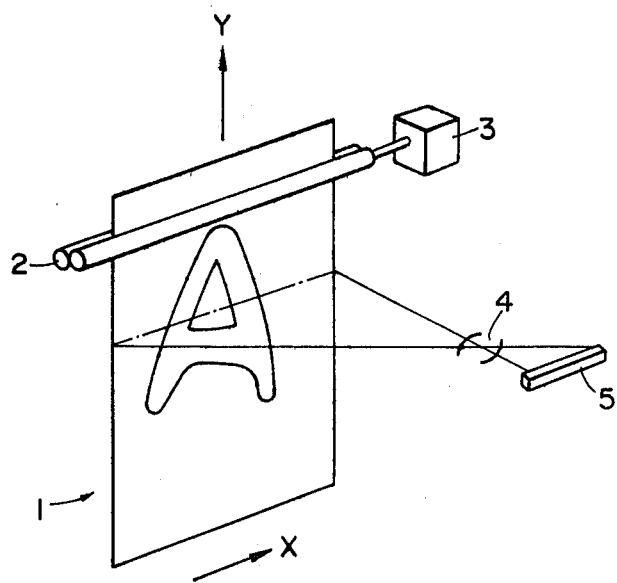
FIG. 1 is a schematic view of a conventional image reading apparatus.

FIG. 1 shows the principle of a conventional image reading apparatus employed in the facsimile apparatus, wherein there is illustrated an original 1, capstan rollers 2 for pinching and stepwise advancing said original 1, a stepping motor 3 for driving said capstan rollers, a lens 4 and a photosensor array 5. The original 1 is uniformly illuminated for example with an unrepresented fluorescent lamp. The original 1 is, stepwise, advanced by scanning pitch by said capstan rollers 2 driven by the motor 3. The image present on the original 1 corresponding to a scan line is projected through the lens 4 onto said photosensor array 5, which reads said image in a direction x and provides time-sequential image signals. The facsimile apparatus transmits said image signals to a distant location after suitable analog-to-digital conversion and code conversion.

Upon completion of the above-mentioned procedure, the stepping motor 3 is activated to advance the original 1 by a scanning pitch in a direction y, and the aforementioned procedure is repeated. In this manner the image of a page is converted into electric signals and transmitted.

Figure 2:
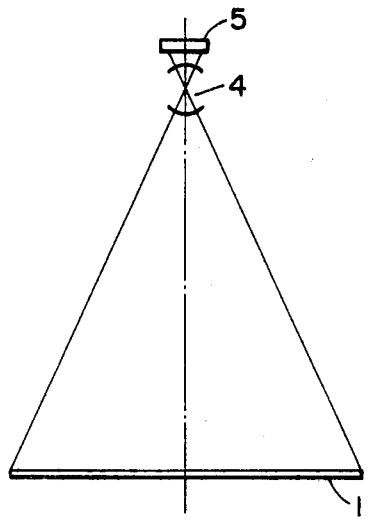
FIG. 2 is a schematic view of the optical system employed in the apparatus shown in FIG. 1.
Figure 3:
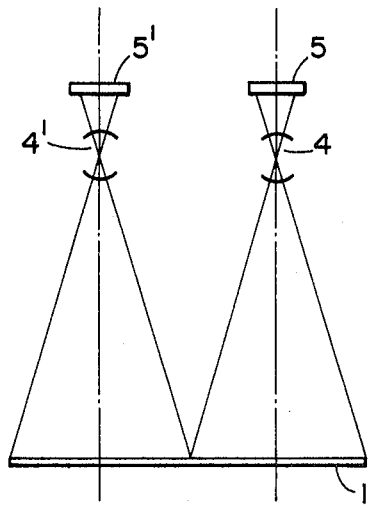
FIG. 3 is a schematic view of another example of the conventional image reading apparatus.

FIG. 2 schematically shows the optical system employed in the conventional image reading apparatus shown in FIG. 1, wherein the image of a scan line on the original 1 is projected the lens 4 onto the photosensor array 5. Assuming that the photosensor array 5 has 1500 photoelectric converting elements and that the original 1 is of A4 size (210×297 mm), the resolution of the image is represented by:

$$1500/210 = 7.14 \text{ pel/mm}$$

wherein pel stands for picture elements. A resolution of 7 pel/mm is enough but not satisfactory for reading ordinary documents, and is definitely insufficient for reading a document such as newspaper, particularly small letters as in the stock market column. Such to drawback can be avoided by increasing the number of photoelectric converting elements in the photosensor array, and, in fact, some photosensors having a larger number of photoelectric elements have been developed, but such sensors are not used in practice because of the higher cost. Also in order to improve the resolving power there can be considered an image reading optical system as shown in FIG. 3, in which there is provided two sets of lenses 4, 4' and photosensor arrays 5, 5' for dividing the image corresponding to one scanning line into plural areas each having a lens and a photosensor array. In this manner the right-hand half of the original is read by a set while the left-hand half of the original is read by the other set, and the electric signals from said photosensor array 5, 5' are mixed in an unrepresented control circuit to provide a reproduction with a higher quality with doubled resolving power. In the illustrated example, the image resolution calculated as above is improved to as high as 14.28 pel/mm.

Such an optical system, however, has to be very small for reading a small original since the distance between the reading optical systems has to be equal to a half of the width of the original, and it is practically impossible to have such a reading system for a very small original such as a microfilm. Besides, the system is very expensive as it requires plural lenses.

The present invention is to provide an image reading apparatus which can prevent the above-mentioned drawbacks and can still be constructed inexpensively.

Figure 4:
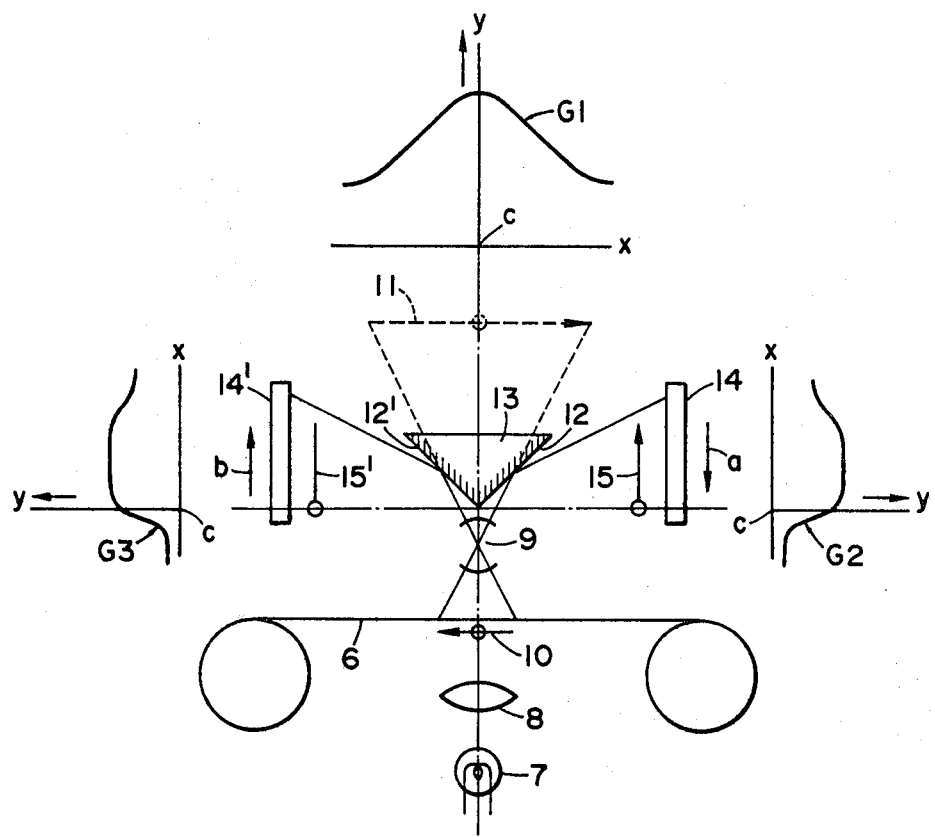
FIG. 4 is a view showing the structure and light intensity distribution in an image reading apparatus embodying the present invention.

FIG. 4 shows an embodiment of the present invention designed for reading the image on a microfilm 6, wherein there is provided a light source 7 for illuminating said microfilm 6, a condenser lens 8 and a projection lens 9. A reflecting member 13 having mutually perpendicular reflecting faces 12, 12' divides the optical path passing through the lens 9 into two optical paths. Said reflecting faces 12, 12' are positioned symmetrically with respect to the optical axis of the lens 9 to divide the image of a scanning line projected by the lens 9 into two areas. The angle between the reflecting faces 12, 12' is not limited to the right angle adopted in the present invention and may be selected differently. Also said reflecting faces 12, 12' need not necessarily be positioned symmetrically with respect to the optical axis. Thus, the imaging positions can be changed by modifying the angle between the reflecting faces 12, 12'. The light beams reflected by the first and second reflecting faces are directed to the first photosensor array 14 and the second photosensor array 14', respectively. Consequently, the image 10 corresponding to a scanning line on the microfilm 6 projected by the lens 9 towards the reflecting member 13 is divided into two portions in the main scanning direction, whereby the left-hand half of said image is focused as an image 15 on the first photosensor array 14 while the right-hand half of said image is focused as an image 15' on the second photosensor array 14'. Each photosensor array 14 or 14' is composed of a linear array of multiple photoelectric converting elements and can be composed, for example, of a CCD line sensor or a photodiode line sensor. In reading the projected images, the first photosensor array 14 reads the electric signals of the photoelectric converting elements thereof from above to below along the direction a while the second photosensor array 14' reads the electric signals of the photoelectric converting elements thereof from below to above along the direction b, and said electric signals are mutually combined to provide time-sequential electric signals. In this manner the main scanning of the microfilm 6 in the longitudinal direction thereof is achieved by the scanning in the direction a, b of the photosensor arrays 14, 14' while the auxiliary scanning of the microfilm 6 is achieved by displacement thereof in the transversal direction thereof, so that said photosensor arrays 14, 14' provide electric signals corresponding to the image on said microfilm.

Figure 5:
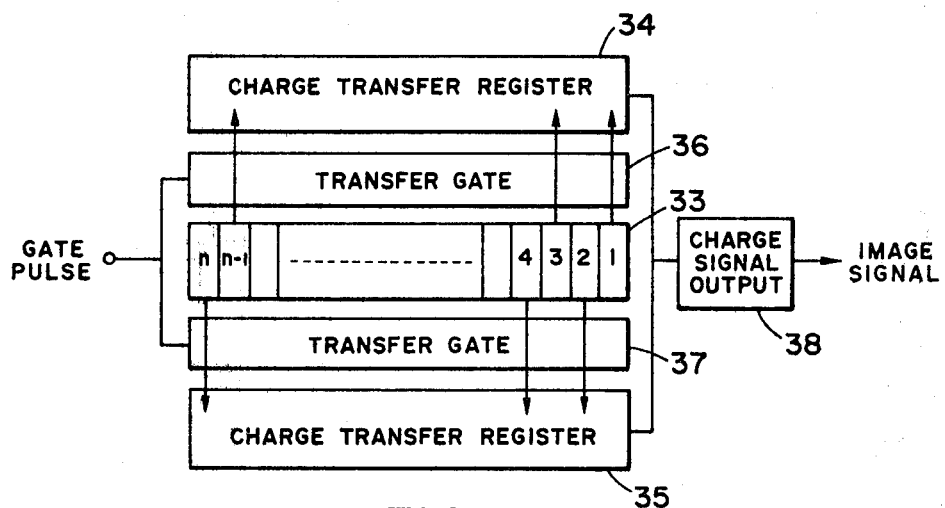
FIG. 5 is a schematic view showing an embodiment of the photosensor array.

FIG. 5 shows an example of the photosensor array composed of a CCD line sensor, comprising a central photosensor area 33 composed of a linear array of multiple photoelectric converting elements, charge transfer registers 34, 35 provided on both sides of said photosensor area 33, and transfer gates 36, 37 provided between said photosensor area and said charge transfer registers for separating the two. The photoelectric converting elements of the photosensor area 35 accumulate charges proportional to the amount of incident light when irradiated with the light from the image for a determined period. In response to a transfer gate pulse, the charges accumulated in the odd photoelectric converting elements are transferred to the transfer register 34 while those in the even elements are transferred to the transfer register 35, and the charges thus transferred to said transfer registers are alternately read through a signal output unit 38 to provide time-sequential image signals. After said charge transfer, the photoelectric converting elements are separated by the transfer gates 36, 37 from the transfer registers and can be utilized again for accumulating the optical information. Said photoelectric converting elements of the photosensor array can be composed, for example, of photo-cells or photodiodes.

The auxiliary scanning of the microfilm can also be achieved by displacing the photosensor arrays 14, 14' in a direction perpendicular to the longitudinal direction thereof, instead of displacing the microfilm.

It is, furthermore, possible to place the reflecting member 13 and the photosensor arrays 14, 14' in a position rotated by 90° about the optical axis of the lens 9, thus achieving the main scanning by the scanning function in the aforementioned directions a and b of said photosensor arrays 14, 14' and the auxiliary scanning by the displacement of the microfilm in the longitudinal direction thereof.

As explained in the foregoing, the present embodiment is capable of reading an image with a higher resolving power by means of a single lens. Thus, the apparatus of the present invention is inexpensive compared with the apparatus shown in FIG. 3, and is still capable of reading a very small image such as an image on a microfilm.

If the reflecting member 13 is removed in the apparatus shown in FIG. 4, the image 10 of a scanning line will be focused at a broken-lined position 11 with a light intensity distribution as shown in a chart G1 given on top of FIG. 4. On the other hand the image 15 has a light intensity distribution as shown in a chart G2 given at right of FIG. 4, while the image 15' has a light intensity distribution as shown in a chart G3 given at left of FIG. 4. In these charts the x-axis represents the distance from the optical axis and the y-axis represents the light intensity. Due to the intensity distribution of the lamp 7 and the $\cos\theta^4$ characteristic of the lens 9, the image 11 shows a higher intensity in the central area and a lower intensity in the peripheral areas. However, in the present invention the light intensity received by the photosensor arrays 14, 14' is made uniform as shown in G2, G3 since the intensity in the central area is reduced by the division by the reflecting member 13. This fact provides an ample margin in the analog-to-digital conversion of the signals read by the photosensor arrays, and simplifies the structure of the apparatus, thus facilitating the adjustment thereof.

Figure 6:
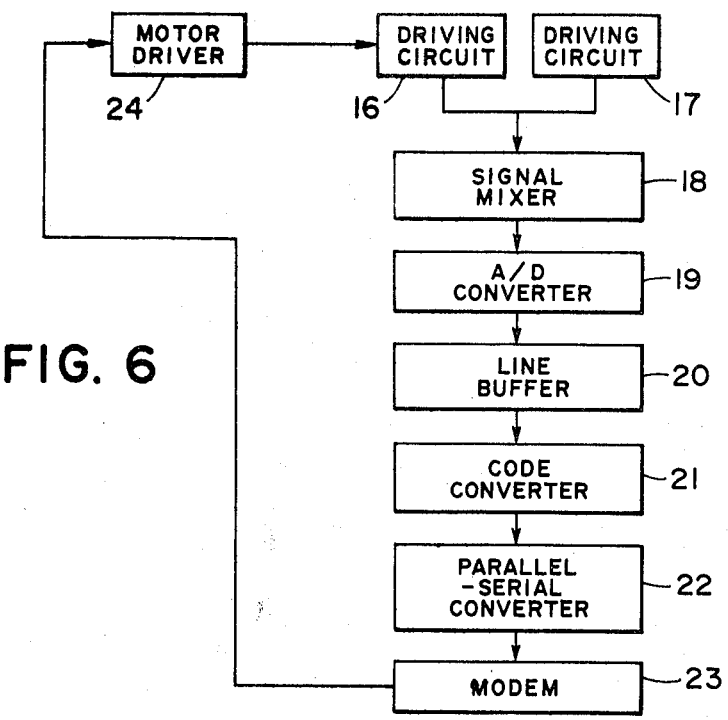
FIG. 6 is a block diagram of a control circuit.

FIG. 6 shows a control circuit for the apparatus shown in FIG. 4 in a block diagram, wherein there is provided drive circuits 16, 17 for driving the photosensor arrays 14, 14', respectively, a signal mixer 18, an A/D converter 19, a line buffer 20, a code converter 21, a parallel-serial converter 22, a modem 23, and a motor driver 24. The driving circuits 16, 17 read the electric signals from respective photosensor arrays to provide time-sequential signals for a scanning line from the signal mixer 18. The A/D converter 19 converts the read analog signals into digital signals according to a predetermined threshold value. The signals thus digitalized may be transmitted to the outside through a telephone line after passing a modem, but in the present embodiment are once stored in a line buffer 20 for band width compression for reducing the amount of signals.

Said signals are then converted in the code converter 21 into their run length and then coded according to the ordinary modified Huffman process or modified Read process. The codes thus obtained are converted into serial signals by the parallel-serial converter 22 and transmitted to the outside through the modem 23. Upon completion of the image transmission of a scanning line, a signal is supplied to the motor driver 24 to displace the microfilm by one scanning pitch in the transversal direction thereof, and the signals from the photosensor arrays are read and processed in the same manner. In this way the image of a frame on the microfilm is transmitted. The block diagram shown in FIG. 6 only shows the concept of the processes which, in fact, are effected in overlapping manner. In practice, for example, as soon as the image signals of a scanning line are transferred to the line buffer the motor is activated to allow reading of the image of the succeeding scanning line, and the image signals already read are simultaneously processed for transmission to the outside.

As explained in the foregoing, the present invention provides reading of even a very small image, such as on a microfilm, with a higher resolving power.

Figure 7:
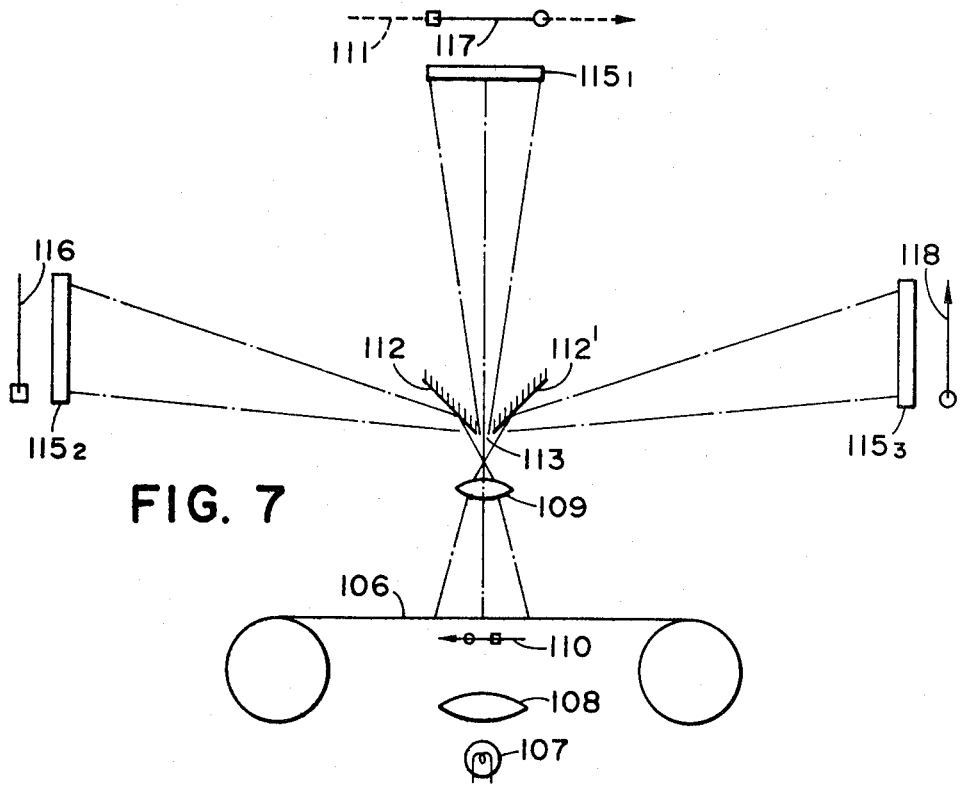
FIG. 7 is a schematic view showing another embodiment of the present invention.

FIG. 7 shows another embodiment of the present invention wherein there is shown a microfilm 106, a light source 107 for illuminating said microfilm 106, a condenser lens 108 and a projection lens 109. The image on said microfilm 106 is illuminated by said light source 107 and the condenser 108 and focused by the lens 109. Thus the image 110 of a scanning line, for example represented by an arrow, will be focused in a position 111.

In the present embodiment, in the optical path of the lens 109, there are provided two reflecting faces 112, 112' in a symmetrical manner with respect to the optical axis of the lens 109, mutually constituting an angle, for example a right angle, and leaving a small gap therebetween. Thus, the central portion of the image projected by the lens 109 is transmitted through the gap 113 between two reflecting faces and is focused on a photosensor array $115_1$, while an image portion reflected by the reflecting face 112 is focused on a photosensor array $115_2$ and that reflected by the reflecting face 112' is focused on a photosensor array $115_3$. Said gap 113 may be filled with a transparent member constituting an integral part of the reflecting faces 112, 112'.

In the above-mentioned structure the image of a scanning line projected by the lens 109 towards the reflecting faces 112, 112' is divided into three portions, of which the right-hand one is projected as an image 116 on the photosensor array $115_2$, the central one is projected as an image 117 on the photosensor array $115_1$, and the left-hand one is projected as an image 118 on the photosensor array $115_3$. In reading, the photosensor array $115_3$ is at first read from above to below, then the photosensor array $115_1$ from right to left, and the photosensor array $115_2$ from below to above, and the image signals thus obtained from different divided areas are combined to obtain signals for a continuous scanning line corresponding to the image 111.

The above-explained structure, capable of image reading of a high resolving power with a lens and three photosensor arrays, is less expensive than the structure shown in FIG. 3 and is also capable of providing an image for a very small original.

Also the uneven light intensity distribution having a higher light intensity in the central area than in the peripheral areas can be compensated by appropriate adjustment of the gap 113 between the reflecting faces 112, 112' whereby the photosensor arrays $115_1$, $115_2$ and $115_3$ can receive uniform amount of light intensity. This fact provides an ample margin in the A/D conversion of the signals received by said photosensor arrays, and enables a simpler structure of the apparatus and easy adjustment.

Figure 8:
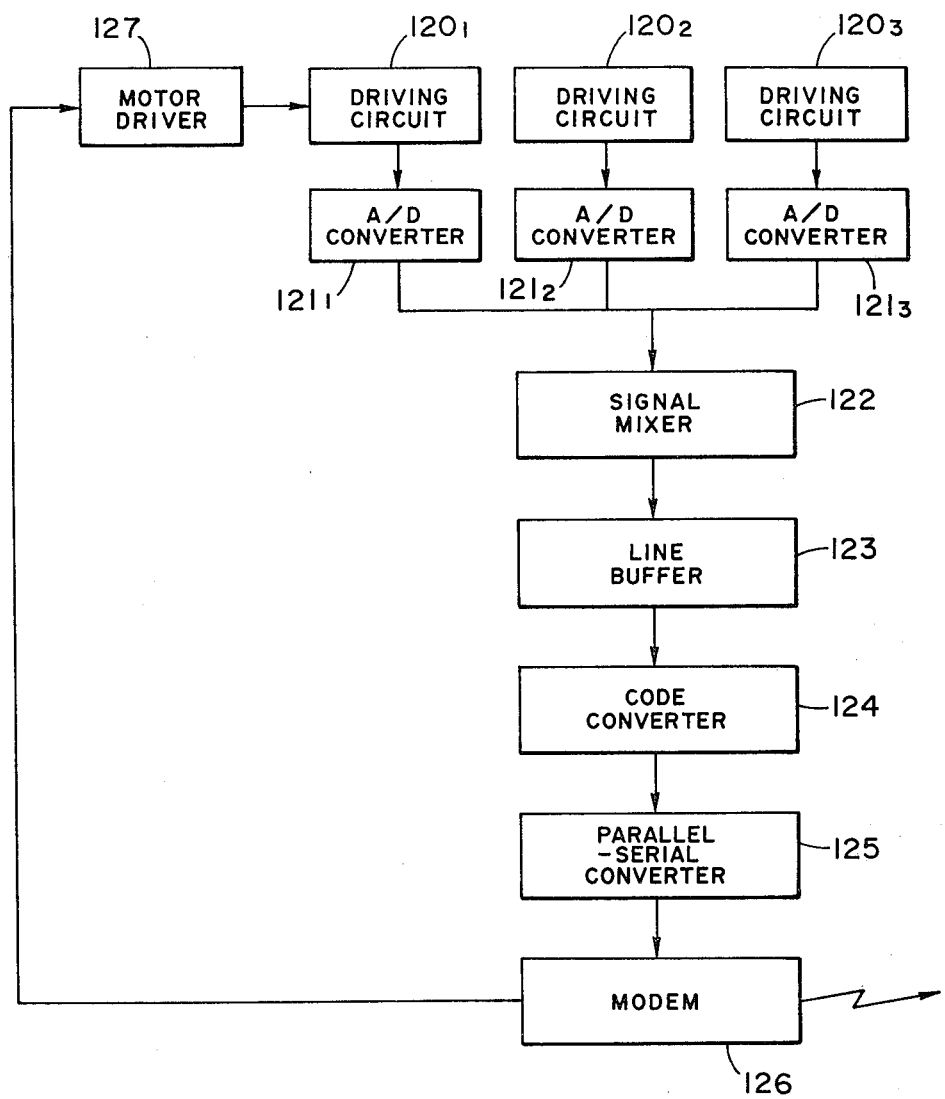
FIG.8 is a block diagram of a control circuit to be employed in the apparatus shown in FIG. 7.

FIG. 8 shows a control circuit for the apparatus shown in FIG. 7 in a block diagram, which provides driving circuits $120_1$, $120_2$, $120_3$ for driving the photosensor arrays $115_1$, $115_2$, $115_3$, respectively, A/D converters $121_1$, $121_2$, $121_3$, a signal mixer 122, a line buffer 123, a code converter 124, a parallel-serial converter 125, a modem 126 and a motor driver 127. The driving circuits $120_1$, $120_2$ and $120_3$ read the electric signals from respective photosensor arrays, and the analog signals thus obtained are converted into digital signals by the A/D converters $121_1$, $121_2$ and $121_3$ according to a predetermined threshold value. The signal mixer 122 converts the read signals into continuous electric signals, which may be transmitted directly to a telephone line through a modem but in the present embodiment are accumulated in the line buffer 123 for band width compression in order to reduce the amount of signals. Said signals are converted in the code converter to their run length and then coded according to the ordinary modified Huffman process or modified Read process. The codes thus obtained are converted into serial signals by the parallel-serial converter 125 and transmitted to the outside through the modem 126. Upon completion of the signal processing for a scanning line, a signal is supplied to the motor driver 127 to displace the microfilm 106 by a scanning pitch in the transversal direction. Thereafter, the signals are read from the photosensor arrays and processed in the same manner, and the image of a frame on the microfilm is transmitted in this manner. Upon completion of the transmission of one frame, the microfilm 106 is advanced in the longitudinal direction thereof to place for transmission another frame in the image reading position.

In the present embodiment each photosensor array is provided with an A/D converter for respective adjustment of the slice level for the analog signals, so that it is rendered possible to electrically compensate the light intensity unevenness resulting from the difference in the optical aperture of the photosensor arrays.

Figure 9:
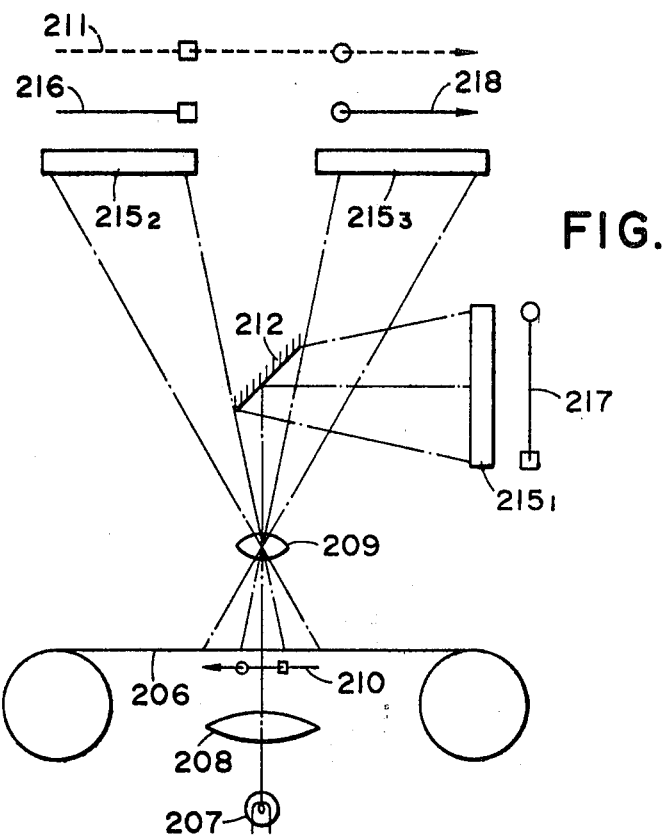
FIGS. 9 and 10 are schematic views showing still other embodiments of the present invention.
Figure 10:
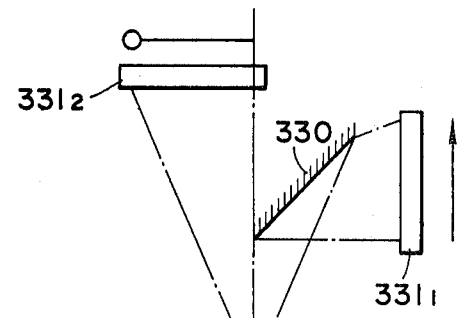
Figure 10:
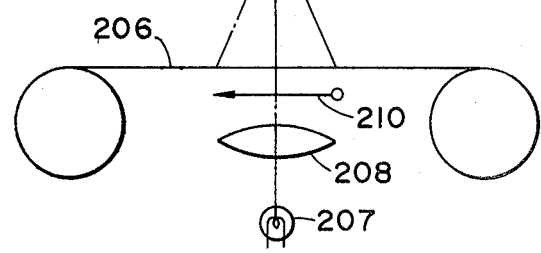

FIGS. 9 and 10 show still other embodiments of the present invention. In FIG. 9, there is shown a microfilm 206, a light source 207 for illuminating said microfilm 206, a condenser lens 208 and a projection lens 209. The image on the microfilm 206 is illuminated by the light source 207 and the condenser lens 208 and is magnified and projected through the lens 209.

In the light path of said lens 209 there is provided a reflecting face 212 angled to the optical axis of said lens 209 and positioned in the central portion of said light path to reflect a portion of the image projected by the lens 209.

Thus, a portion of the image around the optical axis is reflected by said reflected face 212 and focused on a photosensor array $215_1$, while the portions of said image not reflected by said reflecting face are focused on mutually separated two photosensor arrays $215_2$ and $215_3$.

In the above-explained structure the image projected by the lens 209 towards the reflecting face 212 is divided into three portions, of which the right-hand one is focused as an image 216 on the photosensor array $215_2$, while the central one is reflected by the reflecting face 212 and focused as an image 217 on the photosensor array $215_1$, and the left-hand one is focused as an image 218 on the photosensor array $215_3$. In reading, the photosensor array $215_3$ is at first read from right to left, then the photosensor array $215_1$ is read from above to below and the photosensor array $215_2$ is read from right to left, and the image signals thus obtained for divided areas are combined to obtain signals of a continuous scanning line corresponding to the image 211.

In the above-explained structure it is possible to compensate the unevenness of the light intensity having a higher light intensity in the central area than in the peripheral areas by means of employing a mirror of a low reflectivity as the reflecting face 212. In this manner, the photosensor arrays $215_1$, $215_2$ and $215_3$ can receive uniform amount of light, and this face provides an ample margin in the A/D conversion of the signals read from the photosensor arrays and enables a simpler structure of the apparatus and easy adjustment.

In an embodiment shown in FIG. 10 there are provided a reflecting face 330 and photosensor arrays $331_1$ and $331_2$. Of the image projected by the lens 209, the right-hand portion is focused on the photosensor array $331_2$ while the left-hand portion is reflected by the reflecting face 330 and focused on the photosensor array $331_1$.

The image portion projected on the photosensor array $331_1$ is read from above to below while the image portion projected on the photosensor array $331_2$ is read from right to left, and the resulting signals are combined to provide time-sequential image signals.

Naturally, the apparatus of the present invention is not limited to the reading of a microfilm but also is applicable to other originals such as documents or drawings.

What I claim is:

1. An image reading apparatus for reading linearly by photoelectric converting means an image of an original which is divided into at least two parts relative to a main scanning direction, said apparatus comprising:
    optical means for focusing the image of the original on a focusing plane;
    optical path dividing means for dividing, along the main scanning direction, a projecting optical path of the image of the original into at least two optical paths, the optical path dividing means having at least one reflecting surface disposed in association with a part of the main scanning region of the original, wherein the diverging part of the optical paths divided by said reflecting surface extends in a direction intersecting the main scanning direction;
    said photoelectric converting means including at least two line sensors for scanning the original in the main scanning direction, wherein a line sensor is disposed at each of the focusing planes of the divided optical paths; and
    means for moving the original and said line sensors, relative to each other, in an auxiliary scanning direction which is perpendicular to the main scanning direction, for scanning the original in the auxiliary direction.

2. An image reading apparatus according to claim 1, wherein said optical means includes a lens and said reflecting surfaces is disposed between said lens and said line sensor.

3. An image reading apparatus according to claim 1, wherein said apparatus further comprises means to array the output of each line sensor as serial signals in timed relation.

4. An image reading apparatus according to claim 1, wherein said optical path dividing means includes two reflecting surfaces disposed in mutually angled relation, wherein the intersecting part of the two reflecting surfaces extends in a direction normal to the main scanning direction, and wherein the reflected light from the main scanning region of the original divided by said two reflecting surfaces is directed to the at least two line sensors disposed in association with the divided main scanning regions, respectively.

5. An image reading apparatus according to claim 4, wherein said two reflecting surfaces are formed by a mirror having a V-shaped cross section.

6. An image reading apparatus according to claim 1, wherein said light path dividing means includes two reflecting surfaces disposed in mutually angled relation and having a space therebetween.

7. An image reading apparatus according to claim 6, wherein the main scanning region of the original is divided into three parts by said two reflecting surfaces and said apparatus has at least three line sensors with each line sensor being disposed in association with a separate one of the three divided main scanning regions.

8. An image reading apparatus for reading an image of an original by linearly scanning the original in a first direction with a line sensor, comprising:
    two reflecting surfaces for dividedly reflecting the scanning region in the first direction of the original, and arranged in a non-parallel relation, wherein said two reflecting surfaces intersect along a line extending in a direction different from the first direction;
    two line sensors each receiving reflected light from an associated one of said two reflecting surfaces; and
    means for moving the original and said line sensors, relative to each other, in a second direction which is normal to the first direction, for scanning the original in the second direction.

9. An image reading apparatus according to claim 8, wherein the intersection line of said reflecting surfaces is disposed in proximity to the scanning region in the first direction along a normal.

10. An image reading apparatus according to claim 8, where said moving means moves said line sensors in the second direction.

11. An image reading apparatus according to claim 8, wherein said moving means moves the original in the second direction.

12. An image reading apparatus according to claim 8, wherein said two reflecting surfaces are a mirror having V-shaped cross section.

13. An image reading apparatus according to claim 8, wherein said apparatus includes a lens for focusing the image of the original on each line sensor, said lens being disposed between the original and said two reflecting surfaces.

14. An image reading apparatus according to claim 8, wherein the original is a microfilm.

* * * * *

UNITED STATES PATENT AND TRADEMARK OFFICE
CERTIFICATE OF CORRECTION

PATENT NO. : 4,415,934

DATED : November 15, 1983

INVENTOR(S) : MOTOFUMI KONISHI

It is certified that error appears in the above-identified patent and that said Letters Patent is hereby corrected as shown below:

Column 1, line 30, "number photoelectric" should read
--number of photoelectric--;
      line 33, "necessry" should read --necessary--;

Column 2, line 19, "invention.;" should read --invention;--;
      line 58, after "projected" insert --by--.

Column 3, line 2, "such to" should read --such a--.

Column 8, line 18 (Claim 2), "surfaces" should read
--surface--.

Column 9, line 2 (Claim 10), "where" should read --wherein--.

Signed and Sealed this

Twenty-second Day of May 1984

[SEAL]

Attest:

GERALD J. MOSSINGHOFF

Attesting Officer    Commissioner of Patents and Trademarks